United States Patent [19]

Cohen et al.

[11] Patent Number: 5,614,096
[45] Date of Patent: Mar. 25, 1997

[54] COMPRESSED ADSORBENT FILTER CAKE

[75] Inventors: Bernard Cohen, Berkeley Lake; Lee K. Jameson, Roswell; Gerald L. Kochanny, Jr., Cumming, all of Ga.

[73] Assignee: Kimberly-Clark Corporation, Neenah, Wis.

[21] Appl. No.: 448,939

[22] Filed: May 24, 1995

[51] Int. Cl.⁶ .................................................. B01D 39/06
[52] U.S. Cl. ...................................... 210/502.1; 210/505
[58] Field of Search ..................................... 210/650, 651, 210/505, 503, 506, 502.1

[56] References Cited

U.S. PATENT DOCUMENTS

| | | | |
|---|---|---|---|
| 2,375,550 | 1/1945 | Grossman | 99/59 |
| 2,391,981 | 1/1946 | Kremers | 260/256 |
| 2,416,484 | 5/1947 | Kremers | 260/256 |
| 2,472,881 | 6/1949 | Bender | 260/256 |
| 3,108,876 | 5/1961 | Turken et al. | 99/69 |
| 3,130,007 | 4/1964 | Breck | 23/113 |
| 3,573,158 | 3/1971 | Pall et al. | 162/131 |
| 3,998,988 | 12/1976 | Shimomai et al. | 428/400 |
| 4,239,516 | 12/1980 | Klein | 55/389 |
| 4,324,840 | 4/1982 | Katz | 426/422 |
| 4,331,694 | 5/1982 | Izod | 426/422 |
| 4,528,200 | 7/1985 | Coleman | 426/74 |
| 4,810,381 | 3/1989 | Hagen et al. | 210/502.1 |
| 4,976,979 | 12/1990 | Klima et al. | 426/427 |
| 5,208,056 | 5/1993 | Fischer et al. | 426/422 |
| 5,237,945 | 8/1993 | White | 112/420 |
| 5,304,305 | 4/1994 | Lehrer | 210/346 |
| 5,346,566 | 9/1994 | White | 156/71 |
| 5,389,166 | 2/1995 | White | 156/71 |
| 5,401,446 | 3/1995 | Tsai et al. | 264/22 |
| 5,468,536 | 11/1995 | Whitcomb et al. | 428/98 |

FOREIGN PATENT DOCUMENTS

| | | |
|---|---|---|
| 553758 | 6/1932 | Germany . |
| 2713963 | 10/1978 | Germany . |
| 4344805 | 7/1994 | Germany . |
| 1409200 | 7/1988 | U.S.S.R. . |
| 1488340 | 10/1977 | United Kingdom . |
| 93/06924 | 4/1993 | WIPO . |

*Primary Examiner*—Frank Spear
*Attorney, Agent, or Firm*—Karl V. Sidor

[57] ABSTRACT

A compressed adsorbent filter cake for removing caffeine from liquids. The filter cake is composed of a compressed matrix of fibrous material; and adsorbent particulate material integrated within the compressed matrix of fibrous material, so that passage of a liquid having a caffeine concentration ranging from about 20 to about 100 mg per 100 mL of liquid through the matrix for a contact time of less than about 2 minutes results in at least a 40 percent reduction in the caffeine concentration of the liquid. The compressed matrix of fibrous material may a compressed wet-laid fibrous mat. The adsorbent material may be selected from clay minerals and zeolites. Generally speaking, the filter can be adapted to provide at least a 40 percent reduction in the caffeine concentration for about 1 cup to about 40 cups of a liquid.

24 Claims, 2 Drawing Sheets

COMPRESSED ADSORBENT FILTER CAKE

FIELD OF THE INVENTION

The present invention relates to an adsorbent filter system for liquids. More particularly, the present invention relates to sheet or web materials that incorporate materials useful for adsorption.

BACKGROUND OF THE INVENTION

Conventional industrial processes to decaffeinate liquids such as, for example, coffee include: 1) solvent decaffeination, where a solvent such as ethyl acetate is used to extract caffeine from pre-wetted starting material such as, for example, green coffee beans; 2) super-critical carbon dioxide, which uses an inert gas (carbon dioxide) to act as a solvent and remove caffeine from starting material such as, for example, green coffee beans; and 3) water decaffeination, which uses an aqueous extract (e.g., aqueous coffee extract containing equilibrium quantities of the non-caffeine soluble solids but no caffeine) to extract essentially only caffeine from a starting material such as, for example, green coffee beans.

The use of clays, zeolites, activated carbon, or ion-exchange resins as decaffeination aids or processes has been reported in the literature, although these materials are not in wide-scale industrial use. Generally speaking, such materials are used to decaffeinate only caffeine-containing liquids. The removed caffeine cannot be easily recovered once it has adsorbed/absorbed onto clays, zeolites, activated carbon, or ion-exchange resins. In contrast, most conventional industrial decaffeination processes decaffeinate solid starting materials such as, for example, coffee beans. Such conventional industrial processes are generally designed to recover the caffeine which is sold as a chemical once removed from the coffee, tea, cola or other source.

In some decaffeination processes, bentonite clay is mixed with a liquid such as, for example, brewed coffee for about 45 minutes. The bentonite clay is removed by either settling/decanting, filtering, or centrifuging the slurry. Although a large proportion of the caffeine may be removed using this technique, separation of the bentonite clay from the liquid poses problems. A consumer would not wish to wait 45 minutes before having decaffeinated beverages (e.g., decaffeinated coffee), and would not have available centrifugation or the high-pressure filtration required to remove the bentonite.

Accordingly, there is a need for a practical device which uses an adsorbent to remove caffeine from liquids. For example, there is a need for a filter that incorporates clays or zeolites to adsorb caffeine from liquids in order to produce a practical consumer product. A need exists for a filter containing an adsorbent such as, for example, bentonite clays and/or zeolites which could be used in a similar manner as a conventional coffee filter (either basket- or cone-type) to decaffeinate up to an entire pot of coffee or tea as the beverage brewed. A need also exists for a filter containing an adsorbent such as, for example, bentonite clays and/or zeolites which could be used to decaffeinate individual cups of liquid such as, for example, coffee, tea or cola.

There is also a need for a filter that is adapted to decaffeinate liquids within 1 or 2 minutes. A need also exists for a filter that is adapted to decaffeinate liquids cleanly without adsorbent particles passing into the liquid/filtrate and without the need for high pressure differentials. There is also a need for a filter that is adapted to successfully decaffeinate liquids at a wide range of temperatures.

DEFINITIONS

As used herein, the term "nonwoven web" refers to a web that has a structure of individual fibers or filaments which are interlaid, but not in an identifiable repeating manner. Nonwoven webs have been, in the past, formed by a variety of processes known to those skilled in the art such as, for example, meltblowing, spunbonding and bonded carded web processes.

As used herein, the term "spunbond web" refers to a web of small diameter fibers and/or filaments which are formed by extruding a molten thermoplastic material as filaments from a plurality of fine, usually circular, capillaries in a spinnerette with the diameter of the extruded filaments then being rapidly reduced, for example, by non-eductive or eductive fluid-drawing or other well known spunbonding mechanisms. The production of spunbonded nonwoven webs is illustrated in patents such as Appel, et al., U.S. Pat. No. 4,340,563; Dorschner et al., U.S. Pat. No. 3,692,618; Kinney, U.S. Pat. Nos. 3,338,992 and 3,341,394; Levy, U.S. Pat. No. 3,276,944; Peterson, U.S. Pat. No. 3,502,538; Hartman, U.S. Pat. No. 3,502,763; Dobo et al., U.S. Pat. No. 3,542,615; and Harmon, Canadian Patent No. 803,714.

As used herein, the term "meltblown fibers" means fibers formed by extruding a molten thermoplastic material through a plurality of fine, usually circular, die capillaries as molten threads or filaments into a high-velocity gas (e.g. air) stream which attenuates the filaments of molten thermoplastic material to reduce their diameters, which may be to microfiber diameter. Thereafter, the meltblown fibers are carried by the high-velocity gas stream and are deposited on a collecting surface to form a web of randomly disbursed meltblown fibers. The meltblown process is well-known and is described in various patents and publications, including NRL Report 4364, "Manufacture of Super-Fine Organic Fibers" by V. A. Wendt, E. L. Boone, and C. D. Fluharty; NRL Report 5265, "An Improved Device for the Formation of Super-Fine Thermoplastic Fibers" by K. D. Lawrence, R. T. Lukas, and J. A. Young; and U.S. Pat. No. 3,849,241, issued Nov. 19, 1974, to Buntin, et al.

As used herein, the term "microfibers" means small diameter fibers having an average diameter not greater than about 100 micrometers ($\mu$m), for example, having a diameter of from about 0.5 micrometers to about 50 micrometers, more specifically microfibers may also have an average diameter of from about 1 micron to about 20 micrometers. Microfibers having an average diameter of about 3 micrometers or less are commonly referred to as ultra-fine microfibers. A description of an exemplary process of making ultra-fine microfibers may be found in, for example, U.S. Pat. No. 5,213,881 entitled "Nonwoven Web With Improved Barrier Properties" and U.S. Pat. No. 5,271,883, entitled "Method of Making Nonwoven Web With Improved Barrier Properties", both incorporated herein by reference in their entirety.

The term "pulp" as used herein refers to cellulosic fibers from natural sources such as woody and non-woody plants. Woody plants include, for example, deciduous and coniferous trees. Non-woody plants include, for example, cotton, flax, esparto grass, sisal, abaca, milkweed, straw, jute, hemp, and bagasse.

As used herein, the term "cup" is a unit of measure generally referring to a 170-mL portion of liquid.

As used herein, the terms "zeolite" and "zeolitic" refer to molecular-sieve zeolites that are crystalline aluminosilicates of group IA and Group IIA elements such as sodium, potassium, magnesium, and/or calcium. Molecular-sieve zeolites may be natural zeolite minerals or synthetic zeolites. Natural zeolite minerals include, but are not limited to, analcime, chabazite, clinoptilolite, erionite, faujasite, harmotome, heulandite, mordenite, natrolite, philipsite, scolecite, and stilbite. Synthetic zeolites include, but are not limited to, zeolite A, zeolite X, zeolite Y, and zeolite L. Generally speaking, zeolites are complex, crystalline inorganic polymers based on an expansive extending framework of $AlO_4$ and $SiO_4$ tetrahedra linked to each other by the sharing of oxygen ions. This framework contains channels or interconnected voids which, when empty, presents a host structure permeated by micropores that may amount to 50% of the crystals by volume.

As used herein, the term "clay minerals" refers to minerals of the smectite group (often referred to in early literature as the "montmorillonite" group). Clay minerals of the smectite group include, but are not limited to, montmorillonite, beidellite, nontronite, hectorite, saponite, and sauconite. Generally speaking, clay minerals of the smectite group are particles, grains and crystals having a layered or sheet-like structure. These clay minerals typically contain Al, Mg, Na, Si, O, and are hydrated, although other elements may be present. For example, montmorillonite has the general formula $[Al_{1.67}Mg_{0.33}(Na_{0.33})]Si_4O_{10}(OH)_2$. Cations (e.g., Na, Ca, K) may be sorbed between the layers. Clay minerals are composed of extremely fine particles, grains and crystals often having a diameter of less than about 4 micrometers. Bentonite is a clay that is rich in montmorillonite and is intended to be encompassed in the present use of the term "clay minerals".

As used herein, the term "compressed adsorbent filter cake" refers to a cake-like matrix or mat of fibrous material and integrated adsorbent material. A compressed adsorbent filter cake is formed from an aqueous suspension of the fibrous material and integrated adsorbent which is deposited in a forming chamber or onto a forming surface. The materials in the suspension quickly settle as water is removed at a rate which tends to collapse the resulting matrix or mat so that it forms a structure that is substantially free of internal void areas visible to the unaided eye. Generally speaking, conventional wet-laying processes tend to remove water at a rate which would tend to collapse a relatively thick (e.g., ⅛ inch to about 2 inches) matrix or mat of fibrous material. Alternatively, and/or additionally pressure may be applied to the wet cake-like mat to further collapse the structure so it is substantially free of internal void areas visible to the unaided eye.

As used herein, the term "consisting essentially of" does not exclude the presence of additional materials which do not significantly affect the desired characteristics of a given composition or product. Exemplary materials of this sort would include, without limitation, pigments, antioxidants, stabilizers, surfactants, waxes, flow promoters, particulates or materials added to enhance processability of a composition.

SUMMARY OF THE INVENTION

The present invention responds to the needs described above by providing a compressed filter cake with integrated adsorbent for removing caffeine from liquids. The filter is composed of a compressed matrix of fibrous material; and adsorbent particulate material integrated within the compressed matrix of fibrous material, so that passage of a liquid having a caffeine concentration ranging from about 20 to about 100 mg per 100 mL of liquid through the matrix for a contact time of less than about 2 minutes results in at least a 40 percent reduction in the caffeine concentration of the liquid.

Generally speaking, the filter cake can be adapted to provide at least a 40 percent reduction in the caffeine concentration for about 1 cup to about 40 cups of a liquid. For example, the filter cake can be adapted to provide at least a 40 percent reduction in the caffeine concentration for about 1 cup to about 20 cups of a liquid. As another example, the filter cake can be adapted to provide at least a 40 percent reduction in the caffeine concentration for about 1 cup to about 12 cups of a liquid. The liquid to be treated may be selected from, for example, coffee, tea, and cola.

The compressed matrix of fibrous material is a mat or web deposited from an aqueous suspension of fibrous material and adsorbent. For example, the compressed matrix of fibrous material may be a compressed wet-laid mat of fibrous material. The compression may be due to the collapse of the matrix of fibrous material caused by the rapid removal of water. Alternatively and/or additionally, compression may be achieved by application of a squeezing or compaction force.

The fibrous material may be synthetic fibers, natural fibers and/or pulp. The adsorbent material is selected from clay minerals and zeolites. Desirably, the clay minerals are smectite minerals such as, for example, montmorillonite clays. More desirably, the clay minerals are bentonite clays.

The zeolites are selected from natural zeolites and synthetic, crystalline, zeolitic sodium aluminosilicates of the molecular sieve type. For example, the zeolites may be synthetic crystalline zeolite Y and/or zeolitic aluminosilicates having a $SiO_2/Al_2O_3$ molar ratio of from 4.5 to 35 and the essential X-ray powder diffraction pattern of zeolite Y.

According to one aspect of the invention, the filter cake may contain from about 10 to about 90 percent, by weight, adsorbent material. For example, the filter cake may contain from about 20 to about 70 percent, by weight, adsorbent material. Desirably, the filter cake may contain from about 30 to about 60 percent, by weight, adsorbent material.

In an embodiment of the invention, passage of from about 1 cup to about 12 cups of a liquid having a caffeine concentration ranging from about 20 to about 100 mg per 100 mL of liquid through the compressed adsorbent filter cake (i.e., the compressed matrix) for a contact time of from about 30 seconds to about 2 minutes results in at least a 40 percent reduction in the caffeine concentration of the liquid. In another embodiment of the invention, passage of from about 1 cup to about 12 cups of a liquid having a caffeine concentration ranging from about 20 to about 100 mg per 100 mL of liquid through the compressed matrix for a contact time of from about 30 seconds to about 2 minutes results in at least a 60 percent reduction in the caffeine concentration of the liquid. In yet another embodiment of the invention, passage of from about 1 cup to about 12 cups of a liquid having a caffeine concentration ranging from about 20 to about 100 mg per 100 mL of liquid through the compressed matrix for a contact time of from about 30 seconds to about 2 minutes results in at least an 80 percent reduction in the caffeine concentration of the liquid.

The compressed adsorbent filter cake may be treated with a surfactant. For example, the filter cake may be treated with a food grade surfactant to promote wetting of the filter and passage of liquid through the filter. Alternatively and/or additionally, the filter cake may be configured to contain hydrophilic fibers to promote wetting of the filter and passage of liquid through the filter. For example, the filter cake may contain at least about 40 percent, by weight, hydrophilic fibers. As another example, the filter cake may contain about 60 percent, by weight, or more hydrophilic fibers. The hydrophilic fibers may be in the form of cellulosic fibers, pulp and/or hydrophilically transmuted hydrophobic fibers (i.e., hydrophobic fibers rendered hydrophilic by use of internal, external wetting agents and/or surface modification).

According to the invention, the compressed adsorbent filter cake may have a thickness ranging from about ⅛ inch to about 2 inches (about 0.3 cm to about 5 cm).

The present invention also encompasses a compressed adsorbent filter cake in the form of a multilayer material composed of at least two layers of the compressed adsorbent filter cake. In yet another aspect of the present invention, the multilayer material may be composed of at least one layer of the compressed adsorbent filter cake and at least one other layer. The other layer may be, for example, woven fabrics, knit fabrics, bonded carded webs, continuous spunbond filament webs, meltblown fiber webs, apertured film-like materials, and combinations thereof.

The apertured film-like material may be selected from, for example, perf-embossed films, textured apertured films, reticulated apertured films, contoured apertured films, film-nonwoven apertured laminates, and expanded plexi-filamentary films.

DETAILED DESCRIPTION OF THE INVENTION

Figure 1:
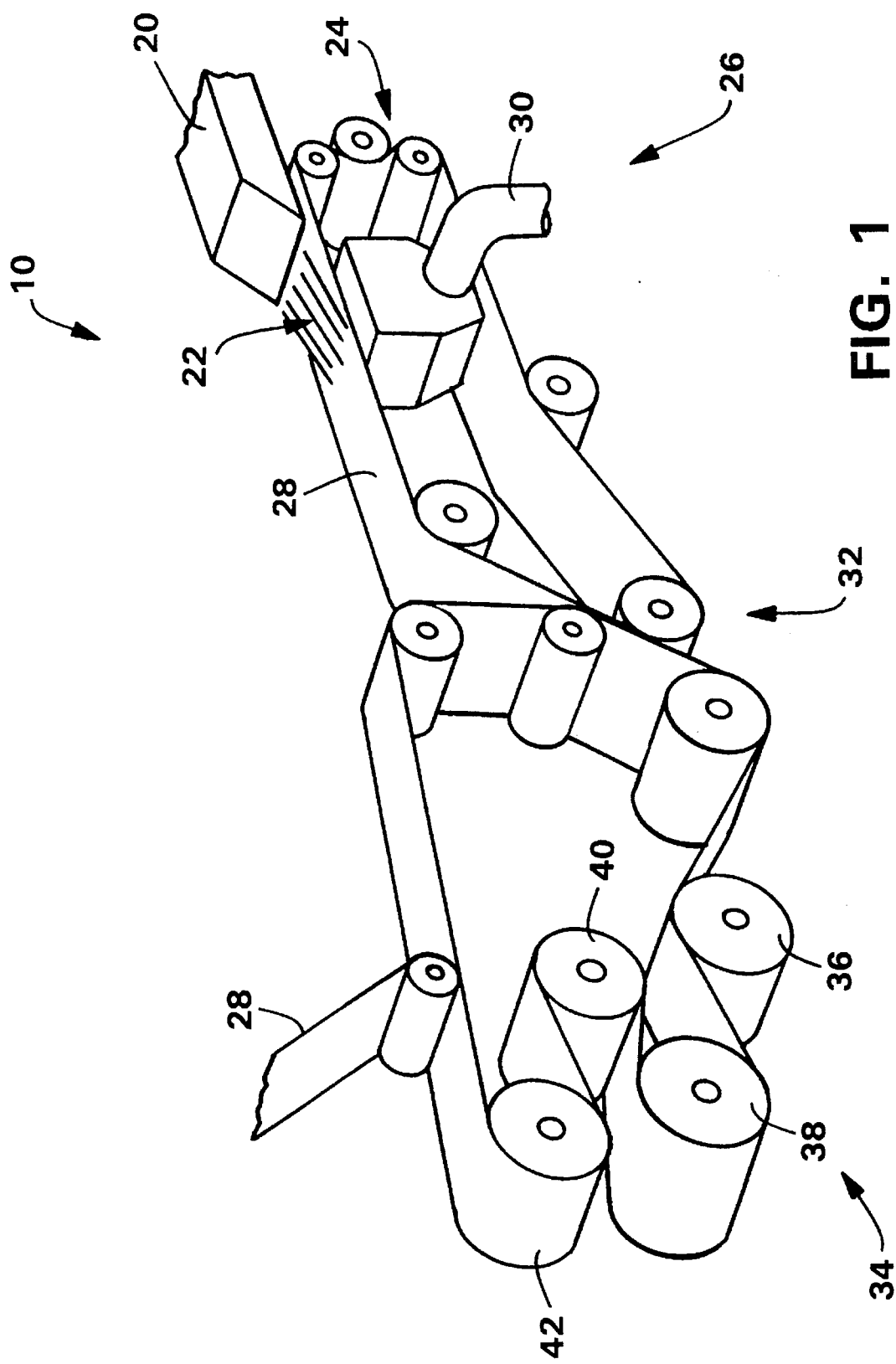
FIG. 1 is an illustration of an exemplary method for making a compressed adsorbent filter cake for removing caffeine from liquids.

Referring to FIG. 1 of the drawings there is schematically illustrated at 10 a process for forming a compressed adsorbent filter cake. This filter cake includes pulp fibers and adsorbent materials.

The filter cake is made by forming a suspension of fibers and adsorbent materials, supplying that suspension to a headbox 20 and depositing it via a slice 22 as a slurry onto a foraminous screen 24 of a conventional papermaking machine 26.

The suspension of fibers may be diluted to any consistency which is typically used in conventional wet-laying processes. For example, the suspension may contain from about 0.02 to about 5 percent by weight fibers and/or adsorbent suspended in water.

Generally speaking, adsorbent material is blended in the pulp slurry prior to formation of the sheet. Alternatively and/or additionally, the adsorbent materials may be deposited in the pulp slurry as it enters the headbox, while in the slice or as it is deposited on the foraminous screen.

The suspension of fibers and adsorbent material is deposited on the foraminous surface 24 and water is removed to form a thick web or mat of fibers and adsorbent material 28. Typically, the foraminous surface 24 is a mesh fabric used in conventional papermaking processes. Water is removed from the deposited layer of fibers and adsorbent material by vacuum dewatering equipment 30 under sufficient vacuum so collapse or flatten the matrix of fibrous material (and integrated adsorbent material) so that it is substantially free of voids that would be visible to the unaided eye. The thick web or mat of fibers and adsorbent material 28 may have a thickness ranging from about ⅛ inch to about two inches.

After the water is drained from the thick web or mat (i.e., cake) 28, it may optionally be subjected to squeezing, compaction or flattening forces supplied by suitable arrangements such as, for example, pressure roll arrangements (not shown) or the like.

The thick web or mat 28 is transferred to a drying operation. A differential speed pickup roll 32 may be used to transfer the web from the foraminous belt 24 to a drying operation. Alternatively, conventional vacuum-type pickups and transfer fabrics may be used. The drying operation may be a compressive or a non-compressive drying operation. For example, the thick web or mat may be dried utilizing a conventional steam can or steam roll arrangement shown in FIG. 1 at 34. The thick mat 28 passes over heated drums 36–42. Other drying processes which incorporate infra-red radiation, yankee dryers, through-air dryers, microwaves, and ultrasonic energy may also be used. The dried material 28 can then be removed and wound on a roll, packaged or introduced into other processes such as, for example, a cutting process where small disks of material are cut out of the mat to form filter cakes.

It may be desirable to use finishing steps and/or post-treatment processes to impart selected properties to the dried thick mat of fibrous material and integrated adsorbent material 28. For example, the web may be mechanically compressed and/or mechanically softened. This softening may be accomplished by calendering, perforating, aperturing, perf-embossing, embossing, pattern embossing, differential drawing, creping, and rollers. Alternatively and/or additionally, chemical post-treatments may be added to the web such as, for example, dyes, surfactants, hydrating agents and/or pigments to impart or enhance desirable properties.

The adsorbent material is selected from clay minerals and zeolites. For example, the clay minerals may be smectite minerals, montmorillonite clays, and bentonite clays. The bentonite clays may be sodium bentonite clays. Desirably, the bentonite clays are calcium bentonite clays, acidified bentonite clays and/or modified bentonite clays containing a flocculating agent. Suitable flocculating agents include, for example, gelatin. The zeolites are selected from natural zeolites and synthetic, crystalline, zeolitic sodium aluminosilicates of the molecular sieve type. For example, the zeolites may be crystalline zeolite Y and/or zeolitic aluminosilicates having a $SiO_2/Al_2O_3$ molar ratio of from 4.5 to 35 and the essential X-ray powder diffraction pattern of zeolite Y. Description of an example of a suitable zeolite may be found in, for example, U.S. Pat. No. 4,331,694 to Izod, the contents of which concerning zeolites is incorporated herein by reference. Some suitable zeolites may be characterized as being zeolitic aluminosilicates having a $SiO_2/Al_2O_3$ molar ratio of from 4.5 to 35, desirably 4.5 to 9, the essential X-ray powder diffraction pattern of zeolite Y, an ion-exchange capacity of not greater than 0.070, a unit cell dimension $a_0$ of from about 24.20 to 24.45 Angstroms, a surface area of at least 350 $m^2/gram$ (B-E-T), a sorptive capacity for water vapor at 25° C. and a $p/p_0$ value of 0.10 of less than 5.00 weight percent and a Residual Butanol Test value of no more than 0.40 weight percent.

The adsorbent material may be added to the pulp slurry by a conventional particulate handling system (not shown) to form the aqueous suspension of adsorbent material and pulp fibers. Exemplary particulate handling systems are described in, for example, U.S. Pat. No. 4,604,313, the contents of which regarding particulate handling systems is incorporated herein by reference. Useful particulate handling systems include various engraved roll volumetric feeders as well as other commercial systems such as, for example, Christy dry material dispensing machines available from the Christy Machine Company of Fremont, Ohio; and Meltex™ SAP series powder application systems available from the Nordson Corporation.

Generally speaking, the adsorbent material may have come in a range of particle sizes. For example, the adsorbent materials may be of sizes characterized by the ability to pass through a screens ranging from 8 mesh to 60 mesh. Some of the absorbent material may be characterized has having average particle diameters of about 20 micrometers or less. Desirably, the adsorbent materials may be characterized has having average particle diameters of about 5 micrometers or less. Desirably, the adsorbent materials are particles having average particle diameters ranging from about 1 micrometer to about 5 micrometers.

The adsorbent materials may be present in the filter cake at a proportion of up from about 10 to about 90 percent, by weight. For example, the absorbent materials may be present in the filter cake at a proportion of about 30 to about 60 percent, by weight. The ratio of adsorbent material to fibrous material may range from about 1:3 to about 1:5 for caffeine removal from a cup (170 mL) of coffee. Generally speaking, it required about 1 g to about 2.5 g of the adsorbent to remove at least 40 percent of the caffeine from one cup of coffee. Thus, for 50 cups of coffee, a typical filter cake would hold from about 50 g to about 125 g of adsorbent and from about 150 g to about 625 g of fibrous material.

The fibrous material may be pulp fibers from woody or non-woody plants. Exemplary wood pulps include bleached and unbleached kraft virgin softwood fiber pulps and bleached and unbleached kraft virgin hardwood pulp. Some useful pulps are those available from the Kimberly-Clark Corporation under the trade designations Alberni K, Longlac 19, Longlac 16, Coosa River 55, Coosa River 56, Coosa River 57 and Grade BHS 533 heat-sealable teabag paper. The pulp fibers may be unrefined or may be beaten to various degrees of refinement.

The fibrous material may also be synthetic fibers, natural fibers, bicomponent fibers, or continuous filaments having various deniers and lengths. Various mixtures of pulp fibers and these other types of fibers may be used. For example, the fibrous component of the adsorbent composite material may contain from about 5 to about 50 percent, by weight, staple length fibers and from about 50 to 95 percent, by weight pulp fibers.

The synthetic fibers may be made from rayon, polyester, polyamides and polyolefins such as, for example, one or more of polyethylene, polypropylene, polybutene, ethylene copolymers, propylene copolymers and butene copolymers. Natural fibers may include, for example, cotton, cotton linters, wool, silk, and flax. Typically, these fibers will have a denier in the range of about 0.7 to about 8 and an average length in the range of about 5 mm to about 36 mm. For example, the fibers may have a denier in the range of about 0.9 to about 3 and an average length in the range of about 10 mm to about 24 mm. Desirably, the fibers may have a denier in the range of about 1 to about 2 and an average length in the range of about 12 mm to about 18 mm.

Although the inventors should not be held to a particular theory of operation, it is generally thought that the compressed matrix of fibrous material that contains the integrated adsorbent particulates should contain about 40 percent, by weight, or more of hydrophilic fibrous material such as, for example, cellulosic fibrous material (e.g., pulp, reconstituted cellulose fibers, surfactant treated fibers and the like). The remaining fibrous material may be hydrophobic fibrous material. For example, the proportion of hydrophilic fibrous material may be 50 percent, by weight, or more. As another example, the proportion of hydrophilic fibrous material may be 60 percent, by weight, or more.

The hydrophilic fibrous material may be hydrophilically transmuted hydrophobic fibers. Such hydrophilic transmuting may be carried out by wetting agents such as, for example, internal wetting agents and external wetting agents. An example, food grade surfactants may be applied to hydrophobic fibrous material such as, for example, polyolefin fibers to render them hydrophilic.

Generally speaking, the presence of hydrophilic fibers enhances liquid take-up into the filter as well as the relatively uniform passage of liquid through the filter. This is important because filters having poor liquid take-up and/or liquid pass-through generally require pressure differentials to drive the liquid through the filter rendering such filters impractical for convenient consumer application. Generally speaking, a small portion of the liquid (e.g., coffee) may be retained in the filter cakes. For example, for contact times of from about 25 to about 45 seconds, a filter cake having a thickness of about 0.6 inch (about 15 mm) composed of 6.1 g pulp and 2.4 g solid adsorbent retained about 33 mL of the 170 mL of coffee treated. As another example, for contact times of from about 65 to about 90 seconds, a filter cake having a thickness of about 0.75 inch (about 19 mm) composed of 10.0 g pulp and 2.5 g solid adsorbent retained about 36 mL of the 170 mL of coffee treated.

The density of the filter cake may vary depending on the type of fiber used to form the fibrous matrix, the amount and type of adsorbent integrated in the matrix, and the compression or "collapse" of the fibrous matrix. For example, the density of a filter cake having a thickness of about 0.6 inch and composed of about 6.1 g pulp and about 2.4 g of solid zeolite particulates had a density of about 0.126 g/cc. As another example, the density of a filter cake having a thickness of about 0.75 inch and composed of about 10.0 g pulp and about 2.5 g of solid particulate had a density of about 0.145 g/cc. As yet another example, the density of a filter cake having a thickness of about 0.75 inch and composed of about 10.0 g pulp and about 3.5 g of solid particulate had a density of about 0.156 g/cc. Generally speaking, the density of the filter cake may range from about 0.1 g/cc to about 0.2 g/cc. As a further example, the density may range from about 1.4 g/cc to about 1.6 g/cc.

Figure 2:
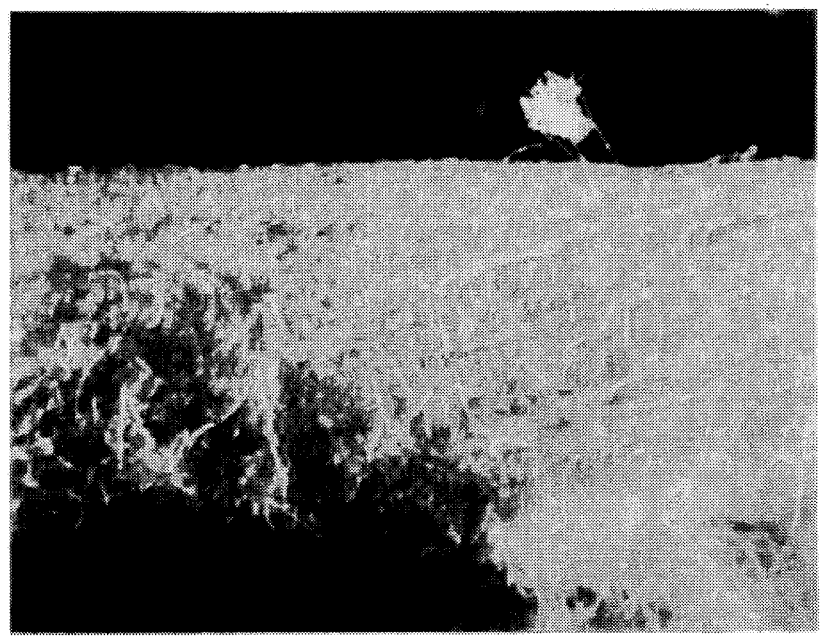
FIG. 2 is a photomicrograph of a cross-section of an exemplary compressed adsorbent filter cake for removing caffeine from liquids.

Generally speaking, the compressed matrix or mat of fibrous material having a lack of large internal void areas may be characterized as having no measurable air permeability. For example, a filter cake having a thickness of ⅛ inch (about 3 mm) was tested on a Testext FX3300 Air Permeability tester (available from Testext Ltd., Zurich, Switzerland) at an opening of 2¾ inches (about 70 mm). No air permeability was detected for the sample. FIG. 2 is a photomicrograph (12X linear magnification) of a cross-section of an exemplary compressed adsorbent filter cake for removing caffeine from liquids. The filter cake in the photomicrograph (FIG. 2) has a thickness of approximately ⅛ inch (3 mm). As can be seen from the cross-section, the filter cake has no large holes or void areas that would be detectable by the unaided eye.

EXAMPLES

Assay Method for Caffeine Detection in Water

Ultraviolet/Visible Spectrophotometry

An assay method using ultraviolet/visible (UV/Vis) spectrophotometry was used to screen the effectiveness of a filter or material for removing caffeine ($C_8H_{10}N_4O_2$) from aqueous caffeine solutions. The screening method consisted of analyzing the aqueous caffeine solutions both before treatment and after treatment or filtration. UV/Vis analysis was done using a Varian 2200 at 272 nm wavelength. The concentration of each sample was determined from a Beer's Law plot which had been generated from a series of aqueous caffeine standards. The percent caffeine removal was calculated using Equation (1):

$$\text{Percent Caffeine Removal} = [1 - (C_8H_{10}N_4O_2\, _{SAMPLE}/C_8H_{10}N_4O_2\, _{CONTROL})] \times 100 \quad \text{Eq. (1)}$$

A typical analysis was as follows: A 0.12 g portion of the adsorbent material was weighed into a 25-mL glass vial, followed by 10.0 mL of a 0.5 mg/mL caffeine solution preheated to 75° C. The mixture was shaken for a specified period of time (standard time=2 minutes), and then filtered through a 0.45-micron syringe filter prior to UV/Vis analysis. Also, a portion of the untreated 75° C. caffeine solution was removed and filtered to serve as the control. The samples and control were analyzed by UV/Vis spectroscopy at a wavelength of 272 nm. It was often necessary to dilute the samples 1:10 by volume with distilled water (for samples having an absorbance >2.5). The concentration of each sample was calculated from a Beer's Law plot generated from aqueous caffeine standards.

Assay Method for Caffeine Detection in Brewed Coffee

High-Pressure Liquid Chromatography (HPLC)

The UV/Vis assay could not be used for actual coffee samples due to interference from other UV/Vis-absorbers; thus, a method using HPLC was developed in order to analyze coffee samples. The samples were diluted to 10 percent strength using distilled water, and filtered through a 0.45-micron syringe filter prior to analysis by HPLC. The conditions were as follows:

Column: 6-micron YMC-Pack Polymer C-18 (4.6 mm diameter×150 mm length)
Detector: UV at 274 nm
Mobile Phase: water/methanol/acetonitrile (90/7/3 by volume)
Flow Rate: 1.5 mL/minute
Injection Volume: 25 uL Under these conditions, the caffeine eluted at 9.5 minutes. A calibration curve was generated using caffeine solution standards; the concentration of a sample was calculated from this curve. The percent caffeine removal was calculated using Equation (1). A comparison of the UV/Vis assay to HPLC analysis showed that similar results were obtained from the two different methods. For example, aqueous caffeine solutions (sample and control) analyzed by UV/Vis showed 100 and 500 ppm caffeine respectively for 80 percent caffeine removal, while the same set analyzed by HPLC showed 110 and 510 ppm caffeine respectively for 78 percent caffeine removal.

Example #1

Caffeine Removal Effectiveness

Several materials were tested with aqueous caffeine solutions using a UV assay method for their effectiveness in removing caffeine. The results (see Table I) show that, of the materials tested, the bentonite clays and the zeolite gave the best removal of caffeine.

TABLE 1

Caffeine Removal by Various Materials in Aqueous Caffeine Solutions

| Material | g/cup level* | Exposure Time | % Caffeine Removal |
|---|---|---|---|
| Sodium bentonite: Volclay 2501 NF-BC, food-grade | 1.7 | 10 min | 92% |
| Calcium bentonite: | 1 | 0.5 min | 71% |
| Pelbon #3002 | | | |
| " | 1 | 2 min | 80% |
| " | 2 | 2 min | 94% |
| Hectalite, 4–8 mesh | 2 | 1 min | 88% |
| " | 2 | 2 min | 90% |
| Hectalite, 40–60 mesh | 2 | 1 min | 92% |
| " | 2 | 2 min | 93% |
| Hectalite, 14–30 mesh | 2 | 2 min | 60% |
| Camargo White | 2 | 1 min | 68% |
| " | 2 | 2 min | 70% |
| Pre-Flocculated bentonite***: | | | |
| H+/4% gelatin | 1 | 0.5 min | 75% |
| " | 1 | 2 min | 83% |
| " | 2 | 2 min | 80% |
| H+/4% gelatin (oven-dried) | 2 | 2 min | 40% |
| 20% gelatin | 2 | 2 min | 53% |
| " | 2 | 60 min | 73% |
| Acid-treated | 1 | 2 min | 77% |
| Zeolite MHS2-173 | 1.7 | 10 min | 84% |
| Activated Carbon | 2 | 2 min | 55% |
| Carbon F816, 8 × 16 mesh | | | |
| Celite diatomaceous earth | 2 | 2 min | 0% |
| Fuller's Earth | 2 | 2 min | 20% |
| Ion-Exchange Resin, Sulfonated Bio-Rad AG50W X8 at 25° C. P1686-25 | 5.1 | 10 min | 90% |
| Ion-Exchange Resin, Sulfonated Bio-Rad AG50W X8 at 75° C. P1686-25 | 4.7 | 10 min | 62% |
| PolyacryLic acid, 3% XL Highly-crosslinked Dowlite Carboxymethyl cellulose: | 1.7 | 10 min | 30% |
| Acid-treated | 1.7 | 10 min | 0% |
| Acid- and heat-treated | 1.7 | 10 min | 0% |

*g/cup = grams of material per 170 mL (cup) of caffeine solution
**This Hectalite was a lower-swelling variety; used for the coform material
***Pre-flocculated samples were freeze-dried unless otherwise indicated

Example #2

Caffeine Capacity of Bentonite/Effect of Temperature and Exposure Time

Portions of a 0.5 mg/mL aqueous caffeine solution were heated to either 55° C. or 75° C., or kept at room temperature. Sodium bentonite (Volclay NF-BC from American Colloid, Arlington Heights, Ill.) was weighed into 25-mL vials in various amounts, and then 10.0 mL of caffeine solution at the temperature to be tested was pipetted into the vial. The vial was constantly mixed using a wrist shaker (highest setting) for either 2 minutes or 10 minutes. After the time period had elapsed, the mixture of bentonite/caffeine solution was immediately filtered through a 0.45-micron syringe filter for caffeine analysis by UV/Vis.

Caffeine analysis showed there was little difference in the amount of caffeine removed between the two exposure times. In addition, the temperature of the caffeine solution did not appear to have an effect on the decaffeination efficiency of the bentonite clays. Levels ranging from 0.1 g/cup (bentonite per 170 mL of aqueous caffeine solution) to 5 g/cup were tested. Table II shows a summary of the results.

TABLE II

Caffeine Capacity of Bentonite as a Function of Temperature

| Ratio of Bentonite to Caffeine Solution (grams/cup) | Temp (°C.) | Exposure Time (min) | % Removal |
| --- | --- | --- | --- |
| 0.1 g/cup | 75 | 2 | 15% |
| 0.1 g/cup | 75 | 10 | 17% |
| 0.5 g/cup | 75 | 2 | 53% |
| 0.5 g/cup | 75 | 10 | 55% |
| 1.0 g/cup | 75 | 2–3 | 82% |
| 2.0 g/cup | 75 | 2–3 | 95% |
| 5.0 g/cup | 75 | 2–4 | 99% |
| 0.1 g/cup | 55 | 2 | 11% |
| 0.1 g/cup | 55 | 10 | 18% |
| 0.5 g/cup | 55 | 2 | 56% |
| 0.5 g/cup | 55 | 10 | 59% |
| 1.0 g/cup | 55 | 2–3 | 85% |
| 2.0 g/cup | 55 | 2–3 | 96% |
| 5.0 g/cup | 55 | 2–4 | 98% |
| 1.7 g/cup | 25 | 2 | 92% |
| 8.5 g/cup | 25 | 45–60 | 99% |

Example #3

Taste Test of Bentonite-Treated Coffee

The coffee was prepared in a 2-burner, Bunn Pour-Omatic® drip coffee machine using 50 g Maxwell House® regular coffee grinds with 1650 g tap water. After brewing, the regular coffee was split into two separate portions, one to serve as the control ("regular coffee") and the other to be treated with 200-mesh, sodium bentonite Volclay NF-BC.

A 350-mL aliquot of the coffee to be treated was swirled with 14.6 g bentonite (7.1 g/cup level) for one minute, centrifuged for 2 minutes, and then filtered through glass fiber filters to remove the bentonite. The centrifugation and filtration took 8–10 minutes. This sample became the "bentonite-treated sample"; subsequent HPLC analysis found this sample had 98 percent less caffeine than the control "regular coffee". In addition, commercial decaffeinated coffee ("commercial decaf") was prepared using 50 g Maxwell House® decaffeinated coffee grinds with 1650 g tap water.

All three samples (the regular, bentonite-treated, and commercial decaffeinated) were reheated using a microwave oven to ca. 40° C. The samples were poured into small paper cups labelled with code letters, as follows:

H=regular coffee
M=bentonite-treated coffee
R=commercial decaffeinated coffee

The code letters allowed a blind taste test to be done.

Four individuals were given a cup of each sample—H, M and R—and asked to rate them either a 2 for most preferred, a 1 for next preferred, and a 0 for least preferred sample. Also, comments were requested for observations of any of the samples. The results of this taste test are summarized in Table III.

TABLE III

Results from Taste Test of Bentonite-treated Coffee

| Code | Sample | Average score* | Tasters' Comments |
| --- | --- | --- | --- |
| M | Bentonite-treated | 1.5 | 1) Least amount of smell but better tasting than 'R'; slight chalky taste; darker color<br>2) Mellow, slight aftertaste<br>3) A little burnt-kind of taste, but not bitter; darker<br>4) Gritty |
| H | Regular coffee | 1.25 | 1) Good smell, good taste<br>2) Slight acrid note, impression of strength<br>3) Bitter bite |
| R | Commercial decaffeinated | 0.25 | 1) Slight bitter taste; good smell, though<br>2) Flat, astringent, unbalanced<br>3) Understated, not bitter, almost almondy; more bitter than 'M' |

*The average score was obtained from the sum of the scores assigned to a particular sample divided by the number of scores for that sample.

Example #4

Pulp/Adsorbent Particulate Cakes

Step A—Preparation of the Pulp/Adsorbent Particulate Cakes

The fiber source for the cakes containing pulp and adsorbent particulates was conventional teabag paper Grade BHS 533 heat-sealable teabag paper (available from Kimberly-Clark Corporation). The paper was shredded by passing twice through a normal paper shredder to form small squares of paper. Sufficient paper to make a single filter was processed with 1500 mL of water utilizing a Waring commercial blender (Model 31B92, Waring Products Division—Dynamics Corporation of America, Hartford, Conn.) on high speed for one minute. The slurry was poured into a three-liter beaker and allowed to settle. Water was removed from the top of the slurry to reduce the volume to 650 mL.

The next step utilized a 3-inch diameter filter cake former. The upper portion of the filter cake former was essentially a 13-inch long piece of 3-inch diameter Schedule 40 PVC pipe having a 3-inch coupling at its bottom. The lower portion of the filter cake former was an assembly of a wire screen (50 mesh stainless steel) and rubber stopper located respectively at the top and bottom of a short bushing that fit flush inside the coupling on the upper portion of the filter cake former.

A circle of filter paper was placed over the wire screen of a lower portion of the filter cake former. The rubber stopper was fitted into the hole opposite the screen. The coupling (and connected pipe section forming the top portion of the filter cake former) was fitted firmly over the screen/bushing/stopper assembly.

The slurry was stirred and poured into the pipe. The slurry was stirred again and the particulates were added. The slurry was then stirred gently enough to disperse the particles within the top third of the slurry column. The rubber stopper was then removed allowing the water to drain from the column. The upper and lower portions of the paper cake former were separated leaving the formed cake having a thickness of about one-inch resting on the wire screen. The cake was inverted onto a blotter sheet and dried in a circulating air oven at 70° C.

Three different types of adsorbents were used in the preparation of the filter cakes. Some samples contained zeolitic sodium aluminum silicate hydrate (Na Al Silicate) having a particle size of about 1 to 5 micrometers generally identified as synthetic, crystalline, zeolitic sodium aluminosilicates of the molecular sieve type having a $SiO_2/Al_2O_3$ molar ratio of from 4.5 to 35 and the essential X-ray powder diffraction pattern of zeolite Y. This material may be obtained from UOP of Tarrytown, N.Y. under the designation 07342-14A. Other samples contained sodium bentonite (approximately 50 mesh size) Grade: CS-50 and calcium bentonite (approximately 40–60 mesh size) Grade: Hectalite, both available form American Colloid Company, Arlington Heights, Ill.

Step B—Evaluation of Filter Cake Caffeine Removal

A masking was placed over a portion of the bottom openings of a conventional one-cup drip coffee maker (i.e., the basket type that holds ground coffee and, when placed over a single cup and filled with hot water, provides brewed coffee—suitable one-cup drip coffee makers may be available from Alfred E. Knobler & Co., Inc. of Moonachie, N.J. under the designation "One-Cup Coffee Maker"). The masking increased the drain time of the one-cup drop drip coffee maker to a minimum of about 60 to about 90 seconds. The bottom of a filter cake having a diameter of about three inches and a thickness of about one inch was enclosed with filter paper and filter paper/filter cake were inserted into the one-cup drip coffee maker.

Coffee was prepared in a 2-burner, Bunn Pour-Omatic® drip coffee machine using 50 g Maxwell House® regular coffee grinds with 1650 g tap water. After brewing, the regular coffee was split into several separate 170 mL portions, one to serve as the control ("regular coffee") and the others to be treated using the filter cakes.

Each 170-mL sample to be treated was poured through a fresh filter paper/filter cake housed in the one-cup drip coffee maker. A record was made of the time required for the filter to drain, and the amount of coffee that passed through the filter. The caffeine concentration was determined using High-Pressure Liquid Chromatography (HPLC) under the conditions described above. The weight of the paper component and the weight and type of the adsorbent component of the filter cake were noted and are reported with the other results in Table V.

TABLE V

Pulp/Adsorbent Particulate Cakes

| Sample | Composition | | Time | Filtrate | HPLC Results (ppm) |
|---|---|---|---|---|---|
| | Paper | Adsorbent | | | |
| 1 | — | — | control | — | 410 |
| 2 | 6.1 g | 2.4 g zeolite | 35 sec. | 130 mL | 270 |
| 3 | 6.1 g | 2.4 g zeolite | 25 sec. | 125 mL | 350 |
| 4 | 6.1 g | 2.5 g bentonite | 45 sec. | 140 mL | 400 |
| 5 | 6.1 g | 2.4 g bentonite | 25 sec. | 132 mL | 390 |
| 6 | — | — | control | — | 510 |
| 7 | 10 g | 2.5 g zeolite | 70 sec. | 134 mL | 390 |
| 8 | 10 g | 2.5 g zeolite | 65 sec. | 134 mL | 310 |
| 9 | 10 g | 2.5 g bentonite | 90 sec. | 136 mL | 380 |
| 10 | 10 g | 2.5 g bentonite | 85 sec. | 134 mL | 400 |
| 11 | — | — | control | — | 410 |
| 12 | 10 g | 3.5 g zeolite | 65 sec. | 100 mL | 55 |
| 13 | 10 g | 3.5 g zeolite | 62 sec. | 115 mL | 90 |

TABLE V-continued

Pulp/Adsorbent Particulate Cakes

| Sample | Composition | | Time | Filtrate | HPLC Results (ppm) |
|---|---|---|---|---|---|
| | Paper | Adsorbent | | | |
| 14 | 10 g | 3.5 g bentonite | 123 sec. | 100 mL | 330 |
| 15 | 10 g | 3.5 g bentonite | 306 sec. | 96 mL* | 180 |
| 16 | — | — | control | — | 430 |
| 17 | 10 g | 3 g zeolite | 56 sec. | 100 mL | 130 |
| 18 | 10 g | 3 g zeolite | 70 sec. | 110 mL | 170 |
| 19 | 10 g | 3.5 g hectalite | 80 sec. | 108 mL | 300 |
| 20 | 10 g | 3.5 g hectalite | 72 sec. | 110 mL | 350 |

*took over 1 minute to start flow.

Disclosure of the presently preferred embodiments and examples of the invention are intended to illustrate and not to limit the invention. It is understood that those of skill in the art should be capable of making numerous modifications without departing from the true spirit and scope of the invention.

What is claimed is:

1. A compressed caffeine adsorbent filter cake, the filter cake comprising:
    a compressed matrix of fibrous material; and
    caffeine adsorbent particulate material integrated within the compressed matrix of fibrous material,
    said filter cake having a thickness of from about 0.3 cm to about 5 cm and a density of from about 0.1 grams/$cm^3$ to about 0.2 grams/$cm^3$ such that the filter cake is adapted to provide at least a 40 percent reduction in a the caffeine concentration of a liquid having an initial caffeine concentration ranging from about 20 to about 100 mg per 100 mL in contact with the filter cake for less than about 2 minutes.

2. The adsorbent filter cake of claim 1, wherein the filter is adapted to provide at least a 40 percent reduction in the caffeine concentration for about 1 cup to about 40 cups of the liquid.

3. The adsorbent filter cake of claim 1, wherein the filter is adapted to provide at least a 40 percent reduction in the caffeine concentration for about 1 cup to about 20 cups of the liquid.

4. The adsorbent filter cake of claim 1, wherein the filter is adapted to provide at least a 40 percent reduction in the caffeine concentration for about 1 cup to about 12 cups of the liquid.

5. The adsorbent filter cake of claim 1, wherein the liquid is selected from coffee, tea, and cola.

6. The adsorbent filter cake of claim 1, wherein the compressed matrix of fibrous material is a compressed wet-laid mat of fibrous material.

7. The adsorbent filter cake of claim 6, wherein the fibrous material is a selected from synthetic fibers, natural fibers and pulp.

8. The adsorbent filter cake of claim 1, wherein the adsorbent material is selected from clay minerals and zeolites.

9. The adsorbent filter cake of claim 8, wherein the clay minerals are selected from smectite clay minerals.

10. The adsorbent filter cake of claim 9, wherein the smectite clay minerals are bentonite clays.

11. The adsorbent filter cake of claim 1, wherein the zeolites are selected from natural zeolites and synthetic zeolites.

12. The adsorbent filter cake of claim 11, wherein the synthetic zeolites are selected from zeolitic aluminosilicates having a $SiO_2/Al_2O_3$ molar ratio of from 4.5 to 35 and the essential X-ray powder diffraction pattern of zeolite Y.

13. The adsorbent filter cake of claim 1, wherein the filter contains from about 10 to about 90 percent, by weight, adsorbent material.

14. The adsorbent filter cake of claim 13, wherein the filter contains from about 20 to about 70 percent, by weight, adsorbent material.

15. The adsorbent filter cake of claim 13, wherein the filter contains from about 30 to about 60 percent, by weight, adsorbent material.

16. A compressed caffeine adsorbent filter cake, the filter cake comprising:

a compressed matrix of fibrous material; and caffeine adsorbent particulate material integrated within the compressed matrix of fibrous material, the caffeine adsorbent particulate material selected from clay minerals and zeolites, said filter cake having a thickness of from about 0.3 cm to about 5 cm and a density of from about 0.1 grams/cm$^3$ to about 0.2 grams/cm$^3$ such that the filter cake is adapted to provide at least a 40 percent reduction in a the caffeine concentration of from about 1 cup to about 40 cups of a liquid having an initial caffeine concentration ranging from about 20 to about 100 mg per 100 mL in contact with the filter cake for less than about 2 minutes.

17. The adsorbent filter cake of claim 16, wherein the clay minerals are selected from bentonite clays.

18. The adsorbent filter cake of claim 16, wherein the zeolites are selected from synthetic zeolitic aluminosilicates having a $SiO_2/Al_2O_3$ molar ratio of from 4.5 to 35 and the essential X-ray powder diffraction pattern of zeolite Y.

19. The adsorbent filter cake of claim 16, wherein the filter contains from about 10 to about 90 percent, by weight, adsorbent material.

20. The adsorbent filter cake of claim 19, wherein the filter contains from about 30 to about 60 percent, by weight, adsorbent material.

21. The adsorbent filter cake of claim 16, wherein the compressed matrix of fibrous material is a compressed wet-laid mat of fibrous material.

22. A compressed caffeine adsorbent filter cake, the filter cake comprising:

a compressed wet-laid mat of fibrous material; and from about 10 to about 90 percent, by weight, of a caffeine adsorbent particulate material integrated within the matrix of fibrous material, the caffeine adsorbent particulate material selected from clay minerals and zeolites, said filter cake having a thickness of from about 0.3 cm to about 5 cm and a density of from about 0.1 grams/cm$^3$ to about 0.2 grams/cm$^3$ such that the filter cake is adapted to provide at least a 40 percent reduction in the caffeine concentration of from about 1 cup to about 40 cups of a liquid having an initial caffeine concentration ranging from about 20 to about 100 mg per 100 ml in contact with the filter cake for less than about 2 minutes.

23. The adsorbent filter of claim 22, wherein passage of from about 1 cup to about 40 cups of a liquid having a caffeine concentration ranging from about 20 to about 100 mg per 100 mL of liquid through the matrix for a contact time of less than about 2 minutes results in at least a 60 percent reduction in the caffeine concentration of the liquid.

24. The adsorbent filter of claim 22, wherein passage of from about 1 cup to about 40 cups of a liquid having a caffeine concentration ranging from about 20 to about 100 mg per 100 mL of liquid through the matrix for a contact time of less than about 2 minutes results in at least an 80 percent reduction in the caffeine concentration of the liquid.

\* \* \* \* \*